United States Patent Office 3,790,523
Patented Feb. 5, 1974

3,790,523
PROCESS FOR PREPARING ACRYLIC ORGANOSOL COATING COMPOSITIONS
Gary W. Orvis, Flint, Mich., assignor to E. I. du Pont de Nemours and Company, Wilmington, Del.
No Drawing. Filed Mar. 20, 1972, Ser. No. 236,443
Int. Cl. C08f 45/26, 47/10; C08j 1/46
U.S. Cl. 260—30.6 R                 6 Claims

ABSTRACT OF THE DISCLOSURE

The improved process for preparing an acrylic organosol coating composition comprises the following steps:

(1) blending together pigment, an organic dispersant, an acrylic organosol and a monomeric plasticizer;
(2) heating the pigment blend prepared above and applying a vacuum to remove solvent and form a powder;
(3) high shear mixing the powder by charging the powder into a roll mill to form pigment chips;
(4) forming a mill base by dissolving the pigment chips in an organic solvent; and
(5) blending the mill base with an acrylic organosol to form an acrylic organosol coating composition;
the resulting acrylic organosols are particularly useful as finishes for the exterior of automobiles and trucks.

BACKGROUND OF THE INVENTION

This invention relates to an improved process for preparing an acrylic organosol coating composition.

Organosols are well known in the art as shown by Thompson U.S. Pat. 3,382,297, issued May 7, 1968 and Duell et al. U.S. Pat. 3,383,352, issued May 14, 1968. In general, there have been problems in dispersing certain pigments in these acrylic organosol coating compositions and in some instances some pigments cannot be used in the acrylic organosol coatings since they cannot be adequately dispersed. Standard techniques of sand-grinding, ball milling, pebble grinding do not adequately disperse these pigments in the acrylic organosol coating compositions and certain pigments, such as indolinone pigments, quinacridones, oxides, copper phthalocyanine blues, greens and carbon black, cannot be made by these standard techniques to provide high quality coatings.

The novel process of this invention disperses all types of pigments in acrylic organosol coatings and provides a finish which has the high standards of appearance for topcoats as required by the automobile industry.

SUMMARY OF THE INVENTION

The improved process for preparing a pigmented acrylic organosol coating composition comprises the following steps:

(1) Blending together the following constituents to form a pigment blend
45-75% by weight of a pigment,
21-51% by weight of an organic dispersant and a clear film-forming acrylic organosol composition in a weight ratio of about 1:1 to about 2:1,
4-10% by weight of a monomeric plasticizer;

(2) Heating the pigment blend prepared in step (1) to about 50-110° C. while applying a vacuum of at least 20 inches of mercury to remove solvent from the blend to form a powder;
(3) Mixing the powder under high shear conditions by charging the powder into a two roll mill having one hot roll at about 65-125° C. and a cold roll at about 20-30° C. for about 5-20 minutes to form pigment chips;
(4) Forming a mill base having a solids content of about 20-50% by weight by dissolving the chips prepared in step (3) in an organic solvent for the chips; and
(5) Blending the mill base prepared in step (4) with an acrylic organosol composition to form a coating composition having a pigment to binder ratio of about 2:100 to about 70:100.

DESCRIPTION OF THE INVENTION

In the first step of the novel process of this invention, 45-75% by weight of a pigment or a mixture of pigments is blended with 21-51% by weight or an organic dispersant and a film-forming acrylic organosol wherein the ratio of organic dispersant to acrylic organosol is about 1:1 to about 2:1 and 4-10% by weight of a monomeric plasticizer. The constituents are blended in conventional batch equipment to wet the pigment surface.

The resulting pigment blend is then heated to about 50-110° C. while applying a vacuum of at least 20 inches of mercury, preferably 20-26 inches of mercury, to remove residual solvent from the blend to form a powder. A 200-gallon Baker-Perkins batch mixer with vacuum equipment and double Nabin blades and a 100 horsepower motor is used.

The resulting powder is then milled under high shear conditions to thoroughly disperse the pigments. This is accomplished by charging the powder into a standard roller mill which has at least one roll, held at about 65-125° C. and a cold roll at about 20-30° C. The powder is rolled on the mill for about 15-40 minutes applying about 75-400 pounds per minute per gram of charge or expressed in another set of units of about 4,000-20,000 foot pounds per linear inch of roll per minute. The resulting product is stripped from the rolls, cooled and pulverized into small particles which are referred to as pigment chips.

These pigment chips are then formed into a mill base by dissolving the chips in an organic solvent for the chips providing a mill base that has a solids content of about 20-50%. This mill base is then blended with a clear acrylic organosol composition to form the resulting coating composition that has a pigment to binder ratio of 2:100 to about 70:100.

In a modification of the novel process of this invention, after the powder is formed in step (2) of the pigment, organic dispersant, acrylic organosol, and plasticizer, it is dissolved in a solvent and subjected to a conventional high shear mixing process, such as sand-grinding or pebble grinding, to thoroughly disperse the pigment and form a mill base which is then blended with an acrylic organosol composition to form a pigmented coating composition.

The novel process of this invention is particularly useful in dispersing the following types of pigments which cannot be dispersed by conventional techniques, such as quinacridone reds, such as magenta quinacridone, indolinone pigment, such as "Irgazin" yellows and oranges, phthalocyanine blues, greens and yellow greens, "Monastral" blue, "Monastral" green pigment, iron oxide yellow pigments and red pigments. Obviously, any of the other conventional pigments can be used in these organosol coating compositions, for example, metallic oxides, such as titanium dioxide, zinc oxide, metal hydroxide, metal flakes, metal powders, chromates, sulphates, carbonates, silica, chalk, and the like, can also be dispersed by the novel process of this invention.

One particularly useful organic dispersant utilized in the novel process of this invention has the structural formula

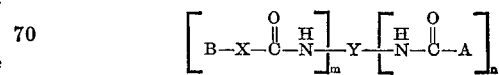

where

B is a polymeric segment, molecular weight of 500–100,000, preferably 1000–10,000, of ethylenically unsaturated monomers lacking Zerewitinoff hydrogen atoms;
X is the residue of a chain transfer agent;
Y is the residue of a di-, tri- or tetraisocyanate radical;
A is the residue of a basic radical having a $pK_a$ value of 6–14, or a salt thereof; and
$m$ and $n$ are 1, 2 or 3.

When $n$ is 2 or 3, only one of A need be as defined.

One particularly preferred organic dispersant has the structure

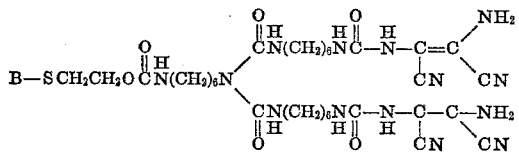

where B is a MMA/2-EHA copolymeric segment.

With some pigments, it is possible to use cellulose acetate butyrate to form the chips instead of the blend of organic dispersant and the acrylic organosol. The pigment, celluose acetate butyrate and the plasticizer are milled as above to form chips. These chips are then formed into a mill base and blended with the acrylic organosol.

A variety of organic plasticizers can be used in the novel process of this invention, such as phthalate esters, for example, butylbenzyl phthalate, dibutyl phthalate, 2-ethylhexylbenzyl phthalate, dicyclohexyl phthalate, dibenzyl phthalate, butylcyclohexyl phthalate, di-2-ethylhexyl ester of hexamethylene diphthalate, di-(methylcyclohexyl) phthalate. One preferred plasticizer of this group is butylbenzyl phthalate. Other plasticizers that can be used are mixed benzoic acid and fatty oil acid esters of pentaerythritol, poly(propylene adipate) dibenzoate, diethylene glycol dibenzoate, ethylene glycol adipate benzoate, and neopentyl glycol adipate benzoate. Other plasticizers are tetrabutylthiodisuccinate, butylphthalyl butyl glycolate, acetyltributyl citrate, dibenzyl sebacate, tricresyl phosphate, toluene ethylsulfonamide.

The acrylic organosol composition used in the novel process of this invention in step (1) in which the pigment is blended with the organosol and in step (5) in which the mill base is blended with the acrylic organosol composition has the film-forming polymer solids content of about 10–60% by weight, and preferably, 20–40% by weight. The film-forming polymer is a graft copolymer represented by the recurring structural unit A–B, where A is the backbone segment of the molecule and B is the graft segment attached to a chemical bond.

The A portion of the graft copolymer can be further represented by an $\alpha$–$b$ structure, i.e., the backbone is a copolymer composed of monomer units ($a$) and monomer units ($b$), where the ($a$) portion, i.e., the ($a$) monomer units, of the A segment is composed of monomer units from monomers of the general structure:

Formula (I)

$$CH_2=\underset{\underset{COOR_1}{|}}{C}R$$

where

R is H, $CH_3$ or $-CH_2CH_3$, and
$R_1$ is an alkyl or cycloalkyl group of 1 through 18 carbon atoms.

These monomers are esters of acrylic acid, methacrylic acid and ethacrylic acid, lower alkyl methacrylates, where the alkyl group had 1–10 carbons being preferred with alkyls of 1–4 carbons, such as methyl methacrylate being especially preferred.

The ($a$) portion should constitue at least 85% by weight of the total A segment.

Although ordinarily the ($a$) portion will be composed entirely of the units referred to above, up to about 50% of its weight can consist of other monomers which do not contribute active grafting sites to the backbone. Illustrative of these are acrylic acid, methacrylic acid and their amides and nitriles such as acrylonitrile and methacrylonitrile; vinyl acetate; styrene; $\alpha$-methyl styrene; vinyl toluene, 3-(2-methacryloxyethyl)-2,2 - spirocyclohexyloxazolidine, and the like.

The ($b$) portion, i.e., the monomer units ($b$), of the A backbone segment provides the potential active grafting sites, i.e., points for attachment for the B branch segment or segments.

The ($b$) portion of the A segment, which comprises up to 15%, preferably 0.2–5%, even more preferably, 0.4–3%, by weight of the total A segment, can be any monomer units that provide available active grafting sites for graft polymerization. Representative of useful grafting site monomer units are those having the following general formula (Formula 2)

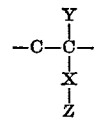

where
X can be

(the carbon atom in this group being attached directly to the backbone),

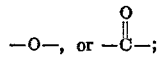

Y can be hydrogen, $-CH_3$ or $-CH_2CH_3$;
Z can be

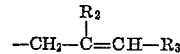

where $R_2$ and $R_3$ are Y

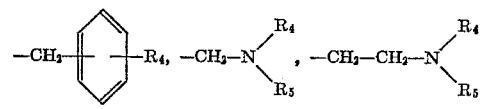

where $R_4$ and $R_5$ are H or alkyl of 1 through 4 carbon atoms, or $-CH_2-CH_2-O-R_6$ where $R_6$ is alkyl of 1 through 4 carbon atoms;

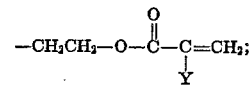

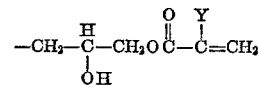

where Y has the same meaning as above;

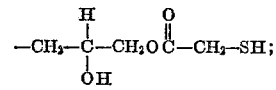

or

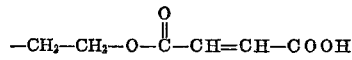

provided that when X is

Z can be —H or —NH—CH$_2$—CH=CH$_2$ and provided further that the combined —X—Z group can be

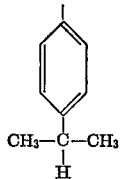

Allyl methacrylate and diethylaminoethyl methacrylate are preferred.

The B segment is the branch segment or branch segments of the graft copolymer. Like the (a) portion of the polymeric backbone segment A, the B segment of the graft copolymer molecule is composed of monomer units from monomers of the general structure of Formula 1 above.

As in the case of the (a) portion, the B portion of the graft copolymer molecule will ordinarily be composed entirely of acrylic units as mentioned above. However, up to about 50% by weight of the B portion can consist of other monomers which do not contribute active grafting sites to the backbone. Illustrative of these are acrylic acid, methacrylic acid and their amines and nitriles such as acrylonitrile and methacrylonitrile; vinyl acetate; styrene; α-methyl styrene; vinyl toluene; 3-(2-methacryl-oxyethyl)-2-spirocyclohexyl-oxazolidine, and the like.

Especially preferred B segments are composed of 2-ethylhexyl acrylate units, butyl acrylate units, or combinations of the two.

The B portion of the graft copolymer is always the branch segment and will not contain any significant amount of a component which provides active grafting sites such as previously indicated by (b).

As will readily be understood by persons in this art, preparation of graft copolymers described above will typically result in a mixture of polymer molecules, of varying number of grafted side chains per molecule. The average number of grafted B segments per A or backbone segment is ordinarily 0.5–5, preferably 1–2.

Although the backbone of A segment can be composed of the same general polymeric structure as the branch or B segment except for the (b) portion of A, the selection of the particularly monomers used in the A and B segments of the graft copolymer should be such that either A or B, if prepared as a separate polymeric entity, is substantially soluble in the organic medium of the organosol, whereas, the other of A and B, if prepared as a separate polymeric entity, is substantially insoluble in the same organic medium. Therefore, in all instances, the backbone including grafting sites or (b) portion, must exhibit a distinct contrast in solubility with the branch segment. Thus, the organosol may have a soluble backbone and an insoluble graft or an insoluble backbone and a soluble graft for any given organic medium.

A segment is substantially soluble in a particular organic medium when, added as a separate polymeric entity, it will form a clear solution in this particular medium. A segment is substantially insoluble when, added as a separate polymeric entity, it will not form a clear solution in the organic medium irrespective of how much solvent is added.

Proper solubility parameter balance between the soluble and soluble segment of the graft copolymer used is important. To achieve maximum stability, the solubility parameter of the insoluble segment (determined as an entity) should differ from that of the soluble segment (determined as an entity). The solubility parameter of the soluble segment and continuous phase ((everything in a liquid state) should be similar to achieve maximum stability.

It should be noted that solubility parameter of the soluble or insoluble segment taken as an entity is a single value. This value is obtained as a result of a simple algebraic relationship based on the solubility parameter of the monomers which form the polymeric entity and the ratio of the monomers to the total monomeric composition of the entityt.[1]

A solubility parameter gradient between the insoluble segment of the graft copolymer and the soluble segment or continuous phase should be at least plus or minus 0.5 parameter unit, for an acceptable dispersion stability, preferably at least plus or minus 1.0 unit. A solubility parameter difference of less than 0.2 unit will lead to dispersions of markedly reduced stability.

The insoluble segment comprises from 20–95% by weight of the total A–B graft copolymer, preferably 65–90%. It will have a number average molecular weight of 10,000–450,000. Particular advantages are obtained, especially when the organosol is used as a coating composition, when the insoluble segment is at least about 50% by weight of the total graft copolymer. Best results in automotive finish applications are obtained when the insoluble segment is at least about 70% by weight of the total graft copolymer.

The soluble segment ordinarily constitutes from 5–80% by weight of the total graft copolymer, preferably 10–35%. The number average molecular weight of the soluble segment ranges from about 2,000–50,000.

The preparation of the graft copolymers of the organosol is accomplished by polymerizing the monomer of the graft copolymer in a good solvent, i.e., one in which both the individual backbone and graft segments and subsequent graft copolymers formed therefrom are soluble. Illustrative of such solvents which form a solution of the graft copolymer or segments thereof are esters, ketones and aromatic hydrocarbons, preferred good solvents are methyl ethyl ketone, xylene, toluene, ethylene glycol monomethyl ether, ethylene glycol monoethyl ether acetate, diethylene glycol monobutyl ether, dimethyl phthalate, diethyl phthalate, diethyl adipate, hexalene glycol diacetate, ethylene glycol diacetone and diacetone alcohol.

In order to convert the graft copolymer solution to an organosol, an organic liquid of such solvency is added so that the resulting solvent mixture becomes a nonsolvent or poor solvent for one of the segments of the graft copolymer but remains a solvent for the other segment.

This effectuates the conversion and produces the desired dispersion. Illustrative of such poor solvents are aliphatic hydrocarbons such as pentane, hexane, V.M. and P. naphtha, petroleum ethers, aliphatic alcohols such as ethanol and propanol, Isopar-E, mineral spirits, dibutyl carbitol, butyl Cellosolve, and mixtures of these.

This partial solubility of the graft copolymer macromolecule produces the self-stabilization of the organosol. This does not preclude the use of external or other stabilizers, particularly when one operates close to the edge or self-stabilization of the system.

Preferably, the acrylic organosol is applied by spraying. In order to apply the film-forming graft copolymer to a substrate in a dual solvency system, the system can be prepared by the addition of suitable solvents which cause the organosol system to contain at least one poor solvent and at least one good solvent for the film-forming polymer as a whole.

---

[1] Solubility parameter of a substance $$= \sqrt{\frac{\text{(Heat of vaporization)} \times \text{(density)}}{\text{Molecular weight}}}$$

Since the heat vaporization is a factor directly influencing the solubility parameter value, the solubility parameter is a value which is absolute and takes into account all the physical forces acting on any specific polymer.

The poor solvent or poor solvent mixture as a whole should be more volatile than the good solvent or good solvent mixture as a whole and will ordinarily have a mean boiling point (determined from its boiling range) falling within the limits of about 30° C. through 220° C., preferably 60–200° C.

The good solvent or good solvent mixture as a whole for the film former should be less volatile than the poor solvent or poor solvent mixture as a whole and should have a mean boiling point within the limits of about 50° C. through 350° C., preferably 80–320° C.

For optimum spray application, the weight ratio of good solvent to poor solvent should be 40/60 to 70/30. There should be present in the solvent blend an amount of a good solvent component equal to about 25–200% of the weight of total film-forming polymer present, which good solvent component has a weight average boiling point at least about 10° C. higher than the mean boiling point of the poor solvent component having the highest boiling range, i.e., the poor solvent component which has the highest dry point.

The graft polymer particles in the acrylic organosol average from 0.05 micron to about 2 microns in diameter. The organosols are stable against settling and can remain in storage for extended periods without caking, flocculating or coagulating.

The graft copolymers used as film-formers in the acrylic organosols can be made by first preparing the A segment, the backbone. This is done by conventionally copolymerizing the (a) portion with the (b) portion. Suitable amounts of appropriate monomers are mixed together in an organic liquid in which the resulting backbone will be soluble, such as esters, ketones or aromatic hydrocarbons, together with from 0.1–2% by weight of a free radical polymerization initiator such as benzoyl peroxide, azobisisobutyronitrile or the like.

This mixture is then brought to the reaction temperature and maintained at this temperature until polymerization is 75–95% complete.

To the reaction mixture in one or more portions, appropriate amounts of the grafting monomer(s) and from 0.1–2% of a graft initiator such as t.-butyl peroxypivalate, t.-butyl peracetate, or benzoyl peroxide are then added. The reaction mixture is brought to its reflux temperature and held at this temperature until 90% conversion to the graft copolymer is obtained. This is determined by analysis for unreacted monomers.

Optionally, at this point, further addition of monomers can be made if desired for further polymerization with the graft copolymer or with any other monomeric or polymeric materials that may be present. Preferably, such monomers will be from the group of monomers used in formation of the non-grafting-site portion of the backbone. Most preferably, monomeric methyl methacrylate can be used at this stage.

Optionally, solutions of preformed compatible polymers can be added at this time to the reaction mass. For example, polymethyl methacrylate, cellulose esters such as cellulose acetate butyrate, polyvinyl acetate, etc., or mixtures thereof can be added.

The resulting reaction product is made into a stabilized organosol by the addition of a poor solvent (as previously defined) for the graft copolymer can be used directly to prepare coating compositions.

Two preferred graft copolymers utilized in the acrylic organosol have the following composition: a backbone of methyl methacrylate/allylacrylate and diethylaminoethyl acrylate having a graft side chain of 2-ethylhexyl acrylate wherein the constituents are in the following weight ratio: methyl methacrylate 82.8%, 2-ethylhexyl acrylate 15.8%, diethylaminoethyl methacrylate 0.8%, allyl methacrylate 0.6%; another particularly useful copolymer is methyl methacrylate, isodecyl methacrylate, allyl methacrylate and methacrylic acid, and has a side chain attached to allyl methacrylate of acrylonitrile, the constituents have the following weight ratio: methyl methacrylate 80.2%, acrylonitrile 8.9% isodecyl methacrylate 9.8%, allyl methacrylate 1.0%, methacrylic acid 0.1%.

Many of the solvents utilized to dissolve the pigmented chips are those that are aforementioned as good solvents for the acrylic graft copolymer. However, it is possible to use a blend of the good solvent and a poor solvent to dissolve the chips so long as the resulting mill base is compatible with the acrylic organosol to form a high quality composition.

The follow example illustrates the novel process of this invention.

EXAMPLE 1

| | Parts by weight |
|---|---|
| Portion 1: | |
|   "Irgazin" yellow pigment (tetrachloroisoindolinone pigment) | 50.07 |
|   Organic dispersant [1] | 23.87 |
| Portion 2: | |
|   Butylbenzyl phthalate plasticizer | 3.28 |
|   Acrylic organosol resin solution (38.6% solids of a graft copolymer of methyl methacrylate/allyl acrylate/diethylaminoethyl methacrylate backbone and a 2-ethylhexyl acrylate graft segment wherein the weight ratio of the constituents is 82.8/6/0.8/15.8) | 22.78 |
| Total | 100.00 |

[1] Having the general formula

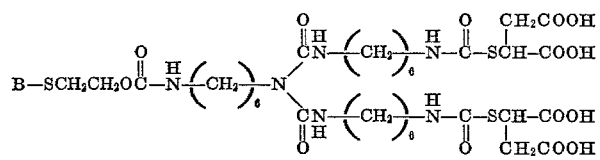

where B is a MMA/2-EHA copolymeric segment.

Portion 1 is charged into a conventional mixing vessel and the constituents are blended together for 5 minutes and then portion 2 is added. The composition is heated to about 65° C. and a vacuum of about 20 inches in mercury is applied, while the mixture is under constant agitation for a 4-hour period. The resulting composition is in the powder form.

The powder is charged onto a two roll mill which one roll is heated to about 95° C. and the other is held at about 25° C. and the powder is milled for about 25 minutes. The resulting composition is stripped from the rolls and ground into small particles hereinafter referred to as pigment chips.

A mill base is then prepared as follows.

| | Parts by weight |
|---|---|
| Portion 1: | |
|   Toluene | 40.0 |
|   Ethylene glycol monoethyl ether acetate | 5.0 |
| Portion 2: | |
|   Pigment chips (prepared above) | 15.0 |
| Portion 3: | |
|   Toluene | 15.0 |
|   V.M. & P. naphtha | 25.0 |
| Total | 100.0 |

Portion 1 is mixed for 5 minutes and then portion 2 is added and mixed 6–8 hours until the chips are dissolved. Portion 3 is then premixed and blended slowly into the composition over a 30-minute period and then the resulting composition is filtered.

The resulting mill base is then blended with the acrylic organosol described above using about 10% by weight of the mill base to the acrylic organosol, and the resulting composition is thoroughly mixed.

The resulting pigmented organosol is reduced to a spray viscosity using conventional solvents and is sprayed onto a primed and sealed steel panel. Each of the panels is baked for about 30 minutes at 165° C. and the finish in each case has excellent adhesion to the sealer coat and has a high gloss, excellent hardness, is resistant to blistering by high humidity and has excellent resistance to water soaking, is highly chip resistant and is resistant to deterioration by weathering.

The following pigments can be substituted for the aforementioned irgazine yellow pigment according to the process of this invention, giving similar results: "Irgazin" orange, Harmon's phthalocyanine blue, "Monastral" blue, "Monastral" green, transoxide red, phthalo green-yellow and carbon black. In each case, a pigmented acrylic organosol composition is formed that is of a high quality.

The following plasticizers can be substituted for the butyl benzyl phthalate plasticizer utilized above: coconut oil phthalate ester plasticizer in combination with a neopentyl glycol adipate benzoate plasticizer in about a 50:50 weight ratio.

What is claimed is:

1. An improved process for preparing a pigmented acrylic organosol coating composition which comprises the following steps:
   (1) blending together the following constituents to form a pigment blend
      45–75% by weight of a pigment;
      21–51% by weight of organic dispersant and a film-forming acrylic organosol composition comprising 10–60% by weight of a film-forming polymer dispersed in an organic liquid in a weight ratio of about 1:1 to about 2:1;
      4–10% by weight of a monomeric plasticizer selected from the group consisting of butylbenzyl phthalate, dibutyl phthalate, 2-ethylhexylbenzyl phthalate, dicyclohexyl phthalate, dibenzyl phthalate, butylcyclohexyl phthalate, di-2-ethylhexyl ester of hexamethylene diphthalate, di-(methylcyclohexyl) phthalate, mixed benzoic acid and fatty oil acid esters of pentaerythritol, poly(propylene adipate) dibenzoate, diethylene glycol dibenzoate, ethylene glycol adipate benzoatez, neopentyl glycol adipate benzoate, tetrabutylthiodisuccinate, butylphthalyl butyl glycolate, acetyltributyl citrate, dibenzyl sebacate, tricresyl phosphate and toluene ethylsulfonamide;
   (2) heating the pigment blend prepared in step (1) to about 50–110° C. while applying a vacuum of at least 20 inches of mercury to remove the solvent from the blend to form a powder;
   (3) mixing the powder under high shear conditions by charging the powder into a two roll mill having one hot roll at about 65–125° C. and a cold roll at about 20–30° C. and applying a shear of about 75–400 pounds per minute per gram of charge for about 5–40 minutes to form pigment chips;
   (4) forming a mill base having a solids content of about 20–50% by weight, by dissolving the chips prepared in step (3) in an organic solvent for the chips; and
   (5) blending the mill base prepared in step (4) with the acrylic organosol composition to form a coating composition having a pigment to binder ratio of about 2:100 to about 70:100;

wherein the organic dispersant consists essentially of a material represented by the structure

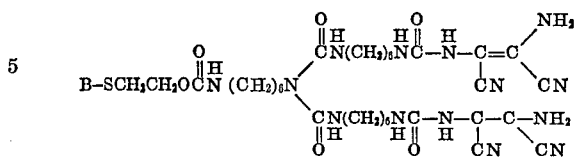

where B is a MMA/2-EHA copolymeric segment; wherein the film-forming constituents consist of the organosol consisting essentially of a graft copolymer comprising a backbone (A) and one or more side chains (B), the backbone (A) being a polymeric segment of units (a) and up to 15% by weight of units (b), said (b) units providing available active grafting sites for graft polymerization, and each side chain (B) above being a polymeric segment, (A) and (B) being different from each other, and (a) and (B) each being composed of at least 50% by weight of units of esters of acrylic, methacrylic and/or ethacrylic acid, provided that such that either (A) or (B) if prepared as a separate polymeric entity, is substantially soluble in said organic liquid, whereas, the other of (A) or (B), if prepared as a separate polymeric entity, is substantially insoluble in the same organic liquid and wherein the insoluble segment of the graft copolymer comprises about 20–95% by weight of the graft copolymer and has a number average molecular weight of about 10,000–450,000 and the soluble segment of the graft copolymer comprises about 5–80% by weight of the graft copolymer and has a number average molecular weight of about 2,000–50,000.

2. The process of claim 1 in which the graft copolymer of the acrylic organosol composition (a) monomer units of the (A) segment consist of methyl methacrylate; and (b) monomer units of (A) segment consists of allyl methacrylate and diethylaminoethyl methacrylate and the monomer units of (B) segment consists of 2-ethylhexyl acrylate.

3. The process of claim 1 in which the graft copolymer of the A segment consist of methyl methacrylate, methof the A segment consist of methyl methacrylate, methacrylic acid, and (b) monomer units of the (A) segment consist of allyl methacrylate and monomer units of the (B) segment consist of acrylonitrile.

4. The process of claim 1 in which the pigments are selected from the group consisting of iron oxide pigments, indolinone pigments, phthalocyanine pigments, quinacridone pigments and carbon black pigments.

5. The process of claim 4 in which the plasticizer is butylbenzyl phthalate.

6. The process of claim 4 in which the plasticizer is a blend of ethylene glycol adipate benzoate and neopentyl glycol adipate benzoate.

References Cited
UNITED STATES PATENTS

| 3,676,377 | 7/1972 | Anderson et al. | 260—15 |
| 3,382,297 | 5/1968 | Thompson | 260—34.2 |
| 3,383,352 | 5/1968 | Duell et al. | 260—34.2 |
| 3,393,162 | 7/1968 | Cox et al. | 260—34.2 |
| 3,532,662 | 10/1970 | Arsdell | 260—34.2 |
| 3,701,746 | 10/1972 | Johnson et al. | 260—31.6 |

ALLAN LIEBERMAN, Primary Examiner

U.S. Cl. X.R.

260—30.8 R, 31.6, 31.8 M, 32.2, 41 R, 41 B

PO-1050
(5/69)

UNITED STATES PATENT OFFICE
CERTIFICATE OF CORRECTION

Patent No. 3,790,523          Dated February 5, 1974

Inventor(s) Gary W. Orvis

It is certified that error appears in the above-identified patent and that said Letters Patent are hereby corrected as shown below:

Column 9, Claim 1, line 46, delete "benzoatez" and insert -- benzoate --.

Column 10, Claim 3, line 42, delete "of the A segment consist of methyl methacrylate, meth-" and insert -- of the acrylic organosol composition (a) monomer units --.

Signed and sealed this 18th day of June 1974.

SEAL)
ttest:

DWARD M. FLETCHER, JR.          C. MARSHALL DANN
ttesting Officer          Commissioner of Patents